Sept. 21, 1943.  P. E. BRUNBERG  2,329,977
WELDING MACHINE
Filed Oct. 9, 1941   2 Sheets-Sheet 1

INVENTOR.
Paul E. Brunberg
BY Barnes, Kisselle, Laughlin & Raisch
Attorneys

Sept. 21, 1943.    P. E. BRUNBERG    2,329,977
WELDING MACHINE
Filed Oct. 9, 1941    2 Sheets-Sheet 2
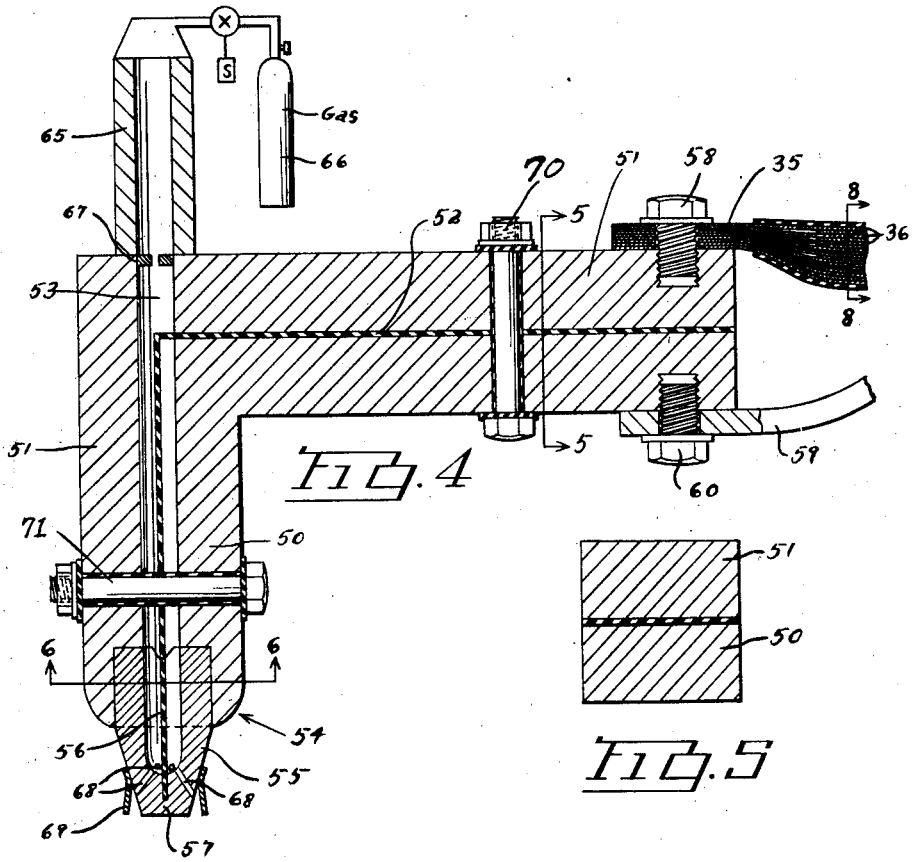
Fig. 4
Fig. 5
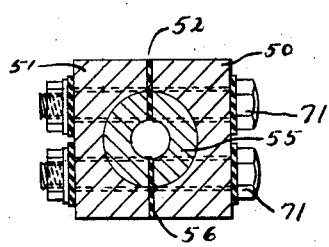
Fig. 6
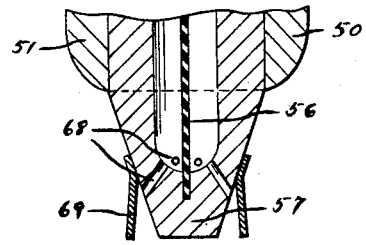
Fig. 7
Fig. 8
INVENTOR.
Paul E. Brunberg
BY
Barnes, Kisselle, Laughlin & Raisch
Attorneys Patented Sept. 21, 1943

2,329,977

UNITED STATES PATENT OFFICE 2,329,977

WELDING MACHINE

Paul E. Brunberg, Detroit, Mich., assignor of one-half to Nita Carol Brunberg and one-half to Robert A. Choate, both of Detroit, Mich.

Application October 9, 1941, Serial No. 414,259

11 Claims. (Cl. 219—4)

The invention relates to an alternating current welding machine, and has particularly to do with a welding circuit and transformer for the same.

The present state of the art of resistance welding is one in which an enormous amount of energy is required to accomplish a fusion operation which basically should require a reasonably small amount of heat. In addition to the high power input, extremely accurate timing is thought to be necessary to accomplish proper welding.

An object of the present invention is the provision of a resistance welding circuit which accomplishes required results with a much lower input of power than is now being used.

It is a further object to obtain these satisfactory results without the necessity of time and pressure being a critical factor. Another object of the invention is the provision of a welding circuit including electrodes which do not become over-heated and in which the heat problem is considerably reduced.

Another important object to the invention has to do with the construction of a welding circuit for spot welding in which the electrodes can be operated at an unusual distance from the primary with satisfactory results, thus making portable welders commercially feasible.

Other objects and features of the invention having to do with details of the design and operation, including the use of gas as a cooling means, will be brought out in the following description and claims.

In the drawings:

Fig. 4 is a sectional view of an electrode tool to be used in the secondary circuit.

Figs. 5 and 6 are sectional views on the lines 5—5 and 6—6, respectively, of Fig. 4.

Fig. 7 is an enlarged view of the contact tip of the welding electrode.

Fig. 8 is an enlarged sectional view taken on line 8—8 of Fig. 4.

The present invention relates particularly to a transformer which may have a general application but which is especially useful in resistance welding. This transformer has the usual type of primary coil with the iron frame and copper winding. The secondary coil consists of two parts; the usual heavy copper coil which normally forms the secondary plus a condenser-like winding arranged in the field of the primary, preferably substantially parallel with the secondary.

Figure 1:
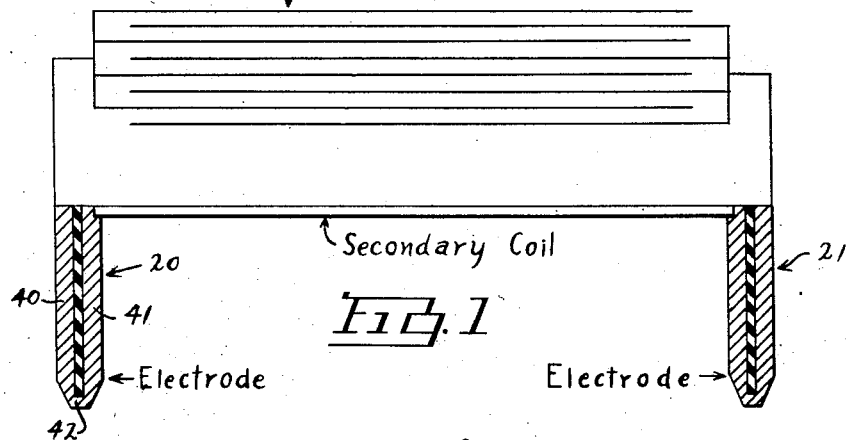
Fig. 1 is a diagrammatic illustration of the secondary circuit designed in accordance with the present invention.
Figure 2:
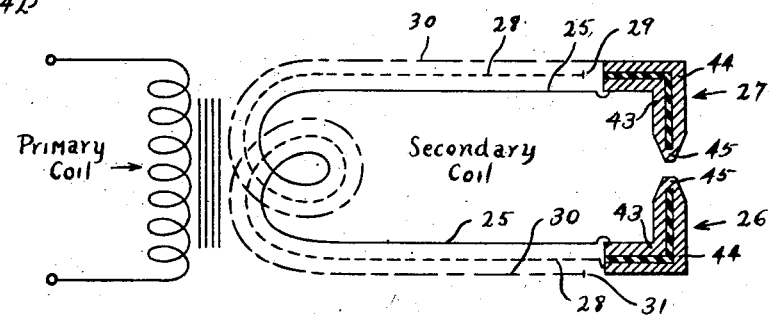
Fig. 2 is also a diagrammatic presentation of the primary and secondary circuits.

Referring to Fig. 1, a secondary coil is shown in laid out position, its respective ends being connected to electrodes 20 and 21. The secondary condenser, shown diagrammatically, is shown laid out and connected to the same electrodes at its respective ends. In Fig. 2, the primary coil is indicated and the secondary coil is shown now in coiled position which, while still diagrammatic, approaches more the actual construction. The solid line 25 represents the secondary coil. It is connected at each end to electrodes 26 and 27. The even-dash line 28 represents one side of the condenser coil and it is shown connected to one electrode 26 and dead-ended at 29 before it reaches the second electrode 27. The long-short dash line 30 is connected to the electrode 27 and dead ended at 31 before it reaches the electrode 26. The secondary coil and each side of the condenser are wound together in insulated relation.

The condenser is preferably composed of flat strips of copper which are laid in parallel relation and insulated from each other, alternate strips projecting from one end of the lamination, as shown at 35 in Fig. 4, and the remaining strips 36 projecting from the other end of the lamination. Fig. 8 shows a sectional view of the laminations of copper with insulation between. The secondary coil used is preferably of approximately the same design as normally used and the condenser strips are laid alongside the secondary coil and bound to it by insulation. Then the entire secondary cable is wound around the primary, as is common at present.

Another feature of the present invention has to do with the electrode design. I prefer to have the electrode split down to the point, the split portions being insulated from each other. In Fig. 1, the electrode 20 is shown with parallel legs 40, 41 connected only at the point 42. In Fig. 2 the electrodes are shown with parallel legs 43 and 44 connected at points 45. In Fig. 4 a working construction is shown. The electrode there shown consists of two L-shaped legs 50 and 51 separated by insulation 52. An axial hole 53 is bored through one leg of the resulting L. The end 54 of the electrode is bored to receive a contact tip 55. The contact tip also has an axial bore and is split and insulated by a strip 56; thus the two electrodes are actually electrically joined at the very tip 57 of insert 55. One end of the condenser is shown connected to the electrode by a connecting bolt 58. The secondary coil 59 is shown connected to the electrode by a bolt 60.

A projection 65 is provided on the electrode connected with bore 53 for furnishing a connection to a tank of gas 66. At the entrance to chamber 53 is a small restriction disc 67 which serves as a type of expansion valve for compressed gas entering the chamber 53. This gas is let out of the insert 55 through holes 68 and is preferably an inert gas which prevents oxidation at the electrodes and at the work. A guard 69 of tape or other material may be applied to the ends, as shown. The total area of hole 68 is intended to be greater than the effective area of restriction disc 67 in order that there will be an expansion and cooling effect in chamber 53 as gas passes in. The legs 50 and 51 of the split electrode are held together by bolts 70 and 71. Bolts 71 also compress the two legs together to hold the insert 55 in place.

In designing the secondary portion of the transformer the same considerations are made as in present transformer design. Keeping in mind satisfactory safety factors, the primary and secondary are wound with a consideration of the load to be borne. I have found that satisfactory results have been obtained by substantially balancing the copper of the secondary coil with the copper of the secondary condenser. For example, with a primary coil having a normal seven and a half K. V. A. rating, I have used a secondary coil approximately one-half inch by one and one-eighth inch of laminated copper and a secondary condenser cable having twenty-five strips each way, fifty in all, the strips being five thousandths by one and one-eighth. The cable was provided with a length which permitted an eighteen inch throat, that is, approximately eighteen inches from the secondary and primary windings to the electrodes. Also, using the same primary winding, I have been able to get a six foot throat in the secondary by using a secondary cable of about sixteen feet with a secondary coil of one and one-eighth inch by one-half inch and fifty copper laminations in all in the secondary condenser.

Figure 3:
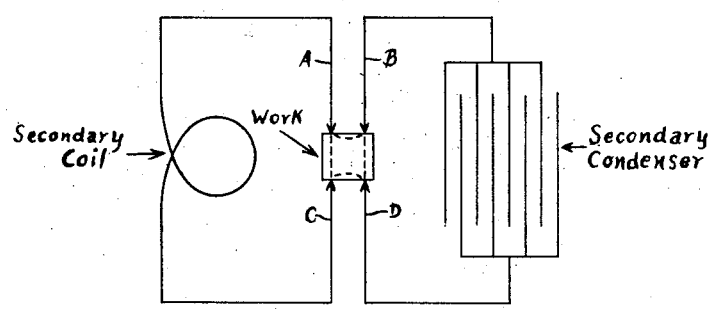
Fig. 3 is a diagrammatic presentation of the secondary circuit illustrating what is thought to be the flow of current in the work during the welding.

By the use of the secondary cable as described, and the split electrodes, I have been able to obtain remarkable fusion effects on all types of work without close regard to time, for example, in welding .050 stainless steel, any time from three to ten cycles has been found to produce desirable welds. One possible explanation for the operation of the current is shown in Fig. 3. Arrows A and B represent the split portions of one electrode and arrows C and D represent the split portions of another electrode. I believe that any current is passed through the work as shown, that it passes not only from A to B and C to D but from A to C and B to D, thus causing an extremely even distribution of heat and remarkable fusion effect. I have found that the power factor of a spot welder using the transformer, as above described, has been greatly improved over the ordinary spot welder. I believe this is due to a reduction of the total impedance of the secondary circuit, resulting in an improved power factor. Oscillograph tests have shown that the condenser current leads the secondary current and that there is a considerable reduction in the normal lag of the circuit when the condenser effect is used. I do not pretend to understand fully all the electrical and theoretical implications of the circuit disclosed but I do claim superior results for the circuit and results which can not be obtained any other way.

What I claim is:

1. A welding circuit comprising a low frequency primary coil for alternating current, a secondary coil, and a secondary condenser made up of sheaves of metal wound with the secondary coil, and electrodes which are connected respectively to one end of the secondary coil and to one end of the condenser.

2. A welding circuit comprising a source of alternating current, a primary coil connected to said source, a secondary coil positioned in the field of said primary coil, and means comparable to a condenser comprising lengths of conducting metal arranged together in insulated relation and positioned also in the field of said primary coil, and electrodes each connected respectively to an end of said secondary and to ends of insulated lengths of said conducting metal.

3. A secondary circuit for a low frequency, alternating current welding machine comprising electrodes, a secondary coil connected at each end to an electrode, a plurality of lengths of conducting metal connected to one electrode, a plurality of lengths of of conducting metal connected to the other electrode, said lengths of metal being arranged in insulated relation substantially adjacent the secondary coil.

4. A secondary circuit for a low frequency, alternating current welding machine comprising electrodes, a continuous secondary coil connected at each end to an electrode, a plurality of lengths of conducting metal connected to one electrode, a plurality of lengths of conducting metal connected to the other electrode, said lengths of metal being arranged in overlapping insulated, alternately-laid relation substantially adjacent the secondary coil throughout its length.

5. A secondary circuit for a low frequency, alternating current welding machine comprising electrodes, a continuous secondary coil connected at each end to an electrode, a plurality of lengths of conducting metal connected to one electrode, a plurality of lengths of conducting metal connected to the other electrode, said lengths of metal being arranged in overlapping, insulated condenser-like relation substantially adjacent the secondary coil throughout its length.

6. A transformer comprising a primary coil, a continuous secondary coil positioned in the field area of the primary coil and connected at each end to outlet points, and means comprising a plurality of lengths of conducting metal arranged together in insulated relation and positioned also in the field area of said primary coil, and means connecting each end of said secondary coil to the ends of a portion of the insulated lengths of conducting metal substantially at the outlet points.

7. In a welding machine, a primary coil, a secondary circuit comprising a secondary coil and a condenser arranged in parallel in the field area of the primary and a pair of electrodes each having split portions insulated from each other and joined at one end, one side of each electrode being joined to the secondary coil and the other side being joined to the condenser.

8. In a welding machine, a primary coil, a secondary circuit comprising a secondary coil and condenser arranged in parallel in the field area of the primary, said condenser comprising a plurality of lengths of conducting metal insulated from each other, and a pair of electrodes each having split portions insulated from each other and joined at the operating end, one side of each electrode being joined to the secondary coil and the other being joined to a portion of the insulated lengths of metal.

9. In a welding machine, a primary coil, a secondary circuit comprising a secondary coil and condenser arranged in parallel in the field area of the primary, said condenser comprising a plurality of lengths of conducting metal insulated from each other.

10. In a welding machine, a primary coil, a secondary circuit comprising a secondary coil and condenser arranged in parallel in the field area of the primary, said condenser comprising a plurality of lengths of conducting metal insulated from each other, every alternate length being connected at one end, and the other lengths connected at the other end.

11. In a transformer circuit, a source of alternating power, a primary coil connected to said source, a secondary coil positioned in the field of said primary coil and connected at each end to outlet points, and means comprising insulated lengths of conducting metal connected alternately at opposite ends and arranged in the field of the primary coil and the secondary coil, and connected in parallel with said secondary coil at the secondary outlets.

PAUL E. BRUNBERG.